US012300927B2

(12) United States Patent
Feng et al.

(10) Patent No.: US 12,300,927 B2
(45) Date of Patent: May 13, 2025

(54) CONNECTOR ASSEMBLY, FIRST CONNECTOR, AND SECOND CONNECTOR

(71) Applicant: LUXSHARE PRECISION INDUSTRY CO., LTD., Shenzhen (CN)

(72) Inventors: Yun Feng, Shenzhen (CN); Min Fan, Shenzhen (CN); Rongqin Lan, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 715 days.

(21) Appl. No.: 17/577,741

(22) Filed: Jan. 18, 2022

(65) Prior Publication Data

US 2022/0311182 A1 Sep. 29, 2022

(30) Foreign Application Priority Data

Mar. 26, 2021 (CN) ......................... 202110323984.7

(51) Int. Cl.
*H01R 13/62* (2006.01)
*H01R 13/24* (2006.01)
*H01R 13/502* (2006.01)

(52) U.S. Cl.
CPC ..... *H01R 13/6205* (2013.01); *H01R 13/2471* (2013.01); *H01R 13/502* (2013.01)

(58) Field of Classification Search
CPC ............ H01R 13/6205; H01R 13/2471; H01R 13/502; H01R 24/86; H01R 2107/00; H01R 13/02; H01R 13/40; H01R 24/00
See application file for complete search history.

(56) References Cited

U.S. PATENT DOCUMENTS 7,351,066 B2 * 4/2008 DiFonzo ............ H01R 13/6205 439/39
9,196,979 B2 * 11/2015 Kim ....................... H01R 13/64
10,658,789 B1 * 5/2020 Wang ..................... H01R 24/28
(Continued)

FOREIGN PATENT DOCUMENTS

CN 2833912 Y 11/2006
CN 101740945 A 6/2010
(Continued)

*Primary Examiner* — Briggitte R. Hammond

(74) *Attorney, Agent, or Firm* — Birch, Stewart, Kolasch & Birch, LLP

(57) ABSTRACT

A connector assembly includes a first connector and a second connector. The first connector includes a number of first conductive terminals, a first insulative body fixing the first conductive terminal, a first cable electrically connected to the first conductive terminals, and at least one first magnet contained in the first insulative body. The second connector includes a number of second conductive terminals, a second insulative body fixing the second conductive terminal, a second cable electrically connected to the second conductive terminals, and at least one second magnet contained in the second insulative body. A coupling surface is formed between the first connector and the second connector. The at least one first magnet and the at least one second magnet are correspondingly engaged with each other at the coupling surface for combining the first connector and the second connector as a whole.

16 Claims, 16 Drawing Sheets

(56) References Cited

U.S. PATENT DOCUMENTS

| | | | | |
|---|---|---|---|---|
| 2011/0171837 | A1* | 7/2011 | Hardisty ............ | H01R 13/6205 439/39 |
| 2017/0317444 | A1 | 11/2017 | Narayanasamy et al. | |
| 2018/0159269 | A1 | 6/2018 | Lipke et al. | |

FOREIGN PATENT DOCUMENTS

| | | | |
|---|---|---|---|
| CN | 202523915 | U | 11/2012 |
| CN | 203911106 | U | 10/2014 |
| CN | 204304081 | U | 4/2015 |
| CN | 110459929 | A | 11/2019 |
| CN | 209766803 | U | 12/2019 |
| CN | 210517181 | U | 5/2020 |
| CN | 210723612 | U | 6/2020 |
| CN | 211150870 | U | 7/2020 |
| CN | 212033291 | U | 11/2020 |
| CN | 212062939 | U | 12/2020 |
| CN | 212725774 | U | 3/2021 |
| JP | 2010-113956 | A | 5/2010 |
| JP | 3195045 | U | 12/2014 |
| KR | 10-2015-0066029 | A | 6/2015 |
| TW | I691124 | B | 4/2020 |
| TW | M600962 | U | 9/2020 |

* cited by examiner

CONNECTOR ASSEMBLY, FIRST CONNECTOR, AND SECOND CONNECTOR

CROSS-REFERENCE TO RELATED APPLICATION

This patent application claims a priority of a Chinese Patent Application No. 202110323984.7, filed on Mar. 26, 2021 and titled "connector assembly, first connector, and second connector", the entire content of which is incorporated herein by reference.

TECHNICAL FIELD

The present disclosure relates to a field of electronic device connection, in particular to a connector assembly comprising a first connector and a second connector.

BACKGROUND

A currently well-known power data wire is usually designed as one-piece and is called an integral power data line. The power data wire is directly connected to small portable electronic devices (such as tablets) and other slightly larger electronic devices (such as computers) through the connectors at both ends thereof, so as to realize the power data transmission between the small portable electronic devices and the slightly larger electronic devices. The integral power data line, no matter which connector is damaged, the power data wire will all be scrapped, and the entire power data wire cannot be used anymore, resulting in a serious waste of resources.

SUMMARY

An object of the present disclosure is to provide a connector assembly comprising a first connector and a second connector, which has the advantages of easy matching between the first connector and the second connector, and easy replacement when one of the first connector and the second connector is damaged, thereby avoiding the waste of resources.

In order to achieve the above object, the present disclosure discloses a connector assembly comprising a first connector and a second connector. The first connector comprises a plurality of first conductive terminals, a first insulative body fixing the first conductive terminal, a first cable electrically connected to the first conductive terminals, and at least one first magnet contained in the first insulative body. The second connector comprises a plurality of second conductive terminals, a second insulative body fixing the second conductive terminal, a second cable electrically connected to the second conductive terminals, and at least one second magnet contained in the second insulative body. A coupling surface is formed between the first connector and the second connector. The at least one first magnet and the at least one second magnet are correspondingly engaged with each other at the coupling surface for combining the first connector and the second connector as a whole.

In order to achieve the above object, the present disclosure also discloses a first connector, comprising an inclined contacting surface adapted for mating with an inclined mating surface of a second connector; a first cable; a first insulative body; a plurality of first conductive terminals fixed in the first insulative body, the first conductive terminals comprising a plurality of first ends and a plurality of second ends, the first ends extending backward for being electrically connected to the first cable, the second ends extending forward and beyond the first insulative body; and a plurality of first magnets contained in the first insulative body and extending forward to abut against the inclined contacting surface.

In order to achieve the above object, the present disclosure further discloses a second connector a second connector, comprising: an inclined mating surface adapted for mating with an inclined contacting surface of a first connector; a second cable; a second insulative body; a plurality of second conductive terminals fixed in the second insulative body, the second conductive terminals comprising a plurality of first ends and a plurality of second ends, the first ends extending forward for being electrically connected to the second cable, the second ends extending backward and beyond the second insulative body; and a plurality of second magnets contained in the second insulative body and extending backward to abut against the inclined mating surface.

Compared with the prior art, because the first connector is magnetically mated with the second connector, and therefore, either the first connector or the second connector is damaged, it can be freely and easily replaced. In other words, it is very convenient to replace a destroyed first connector into a new first connector and the new first connector is very convenient to match with an original second connector, and it is also convenient to replace a destroyed second connector into a new second connector and the new second connector is very convenient to match with an original first connector. Therefore, waste of resources caused by discarding the entire connector assembly is avoided.

DETAILED DESCRIPTION

Figure 1:
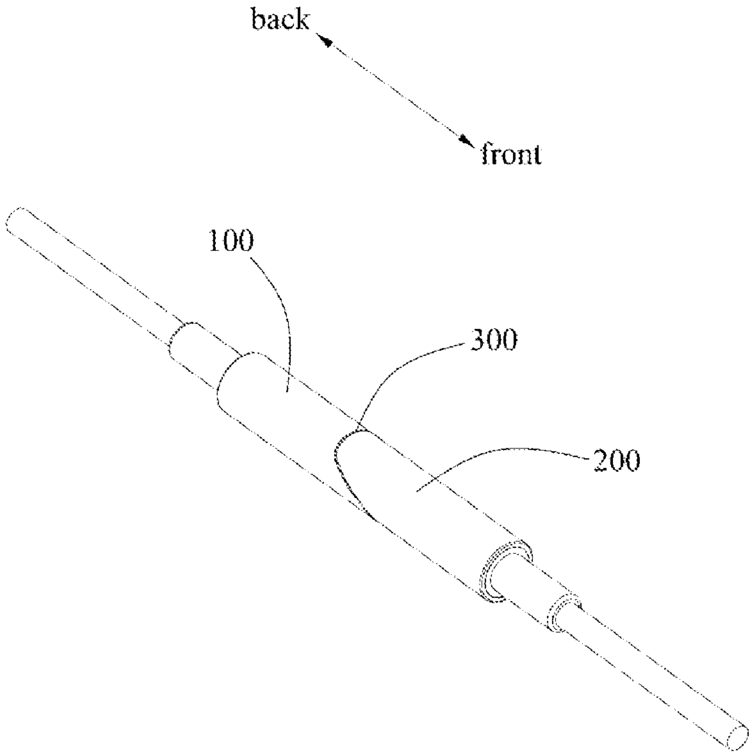
FIG. 1 is a perspective, assembled view of a connector assembly comprising a first connector and a second connector in accordance with an embodiment of the present disclosure.
Figure 2:
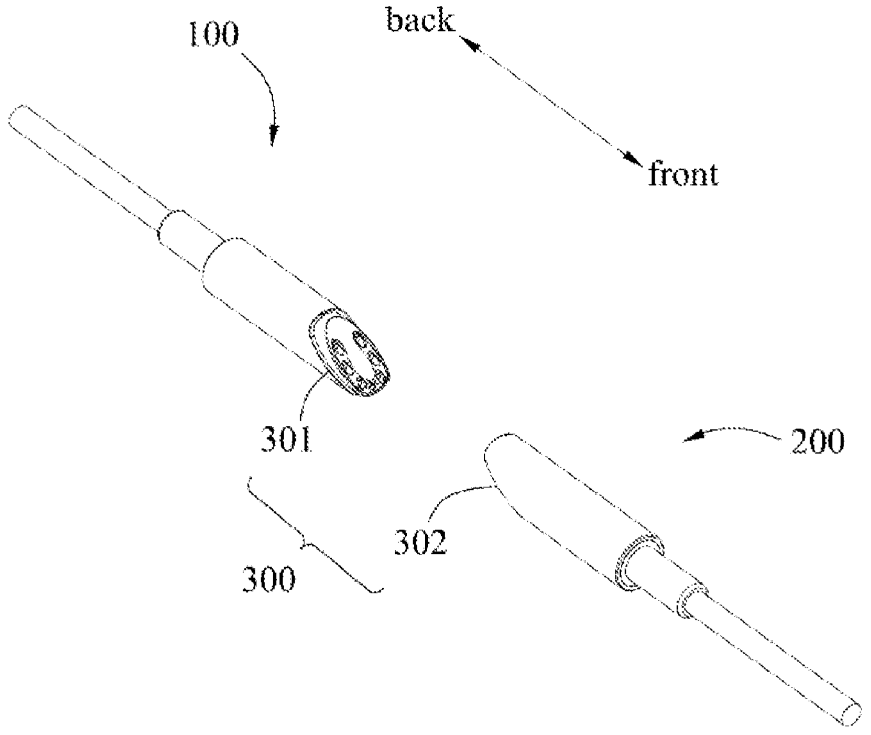
FIG. 2 is a perspective, exploded view of the connector assembly when the first connector is separated from the second connector in accordance with an embodiment of the present disclosure.

At least one exemplary embodiment will be described in detail here, examples of which are shown in drawings. When referring to the drawings below, unless otherwise indicated, same numerals in different drawings represent the same or similar elements. The examples described in the following exemplary embodiment do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Referring to FIGS. 1 to 16, a connector assembly includes a first connector 100 and a second connector 200. A coupling surface 300 is defined between the first connector 100 and the second connector 200. In other words, the coupling surface 300 includes a contacting surface 301 of the first connector 100 and a mating surface 302 of the second connector 200. When the first connector 100 and the second connector 200 are in a combination state, the contacting surface 301 and the mating surface 302 are mated with each other just perfectly and inclinedly. Therefore, at the coupling surface 300, an obliquely-extending joint seam is formed. In other words, the coupling surface 300 is an inclined surface. The word "inclined" means that the coupling surface 300 is not vertical to and not parallel to a mating direction, which is defined by the first connector 100 and the second connector 200. The above-mentioned inclined surface 300 is aimed to have more linear appearance and to facilitate the combination between the first connector 100 and the second connector 200. Of course, in an alternative embodiment, the coupling surface 300 may also be a non-inclined surface which is perpendicular to the mating direction.

Referring to FIGS. 1 to 8, the first connector 100 includes a first insulative body 1, a plurality of first conductive terminals 2, a first cable 3, a first magnet 4, and a first cover 5. The first conductive terminals 2 are fixed in the first insulative body 1. Especially referring to FIG. 3, some first ends of the first conductive terminals 2 extend backward for being electrically connected to the first cable 3 and some second ends of the first conductive terminals 2 extend forwardly but not beyond the first insulative body 1. The first magnet 4 is contained in the first insulative body 1 and extend forward to abut against the contacting surface 301. The first cover 5 covers the first insulative body 1 and the first magnet 4. The second ends of the first conductive terminals 2 which are located adjacent to the contacting surface 301 are not covered by the first cover 5. The first cable 3 is exposed at the rear end of the first cover 5 which is far away from the contacting surface 301.

Referring to FIGS. 9 to 16, the second connector 200 includes a second insulative body 6, a plurality of second conductive terminals 7, a second cable 8, a second magnet 9, and a second cover 10. The second conductive terminals 7 are fixed in the second insulative body 6. Especially referring to FIG. 11, some first ends of the second conductive terminals 7 extend forwardly for being electrically connected to the second cable 8 and some second ends of the second conductive terminals 7 extend backward and beyond the second insulative body 6. The second magnet 9 is contained in the second insulative body 6 and extend backward to abut against the mating surface 302. The second cover 10 covers the second insulative body 6 and the second magnet 9. The second ends of the second conductive terminals 7 which are located adjacent to the mating surface 302 are not covered by the second cover 10. The second cable 8 is exposed at the front end of the second cover 10 which is far away from the mating surface 302.

Referring to FIGS. 1 to 3 and FIGS. 9 to 11, when the first magnet 4 and the second magnet 9 are magnetically engaged with each other at the coupling surface 300, and therefore, the first connector 100 and the second connector 200 are combined as a whole. In an illustrated embodiment of the present disclosure, the second ends of the first conductive terminals 2 retract for a little distance with respect to the contacting surface 301 and the second ends of the second conductive terminals 7 protrude for a little distance with respect to the mating surface 302. As a result, the first conductive terminals 2 are mechanically contacted with the second conductive terminals 7 nearby the coupling surface 303 to achieve electrically connection between the first conductive terminals 2 and the second conductive terminals 7.

Figure 3:
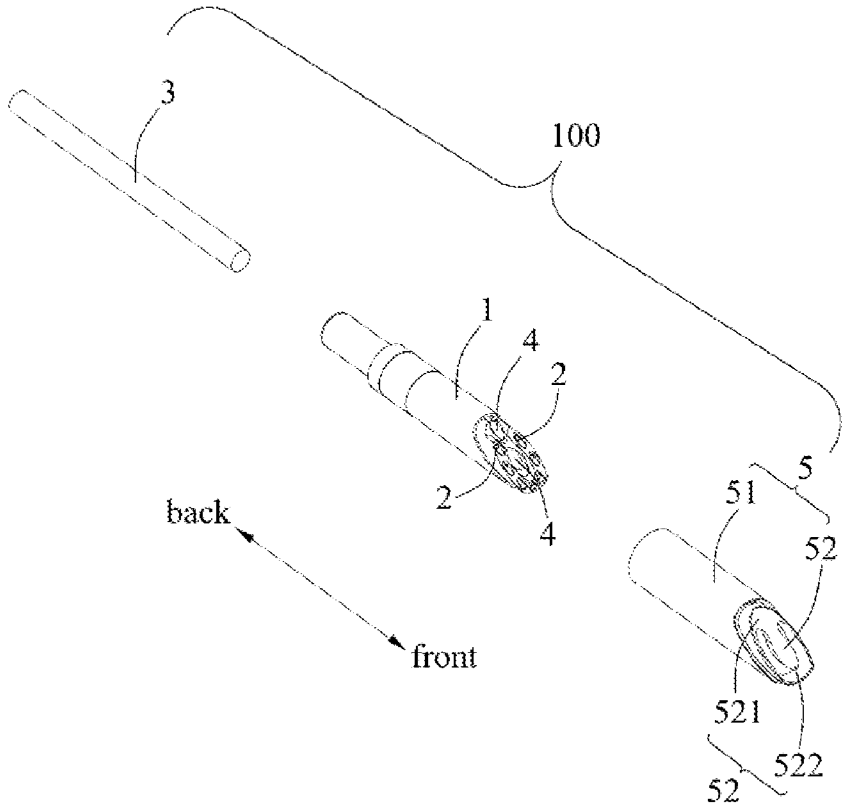
FIG. 3 is a perspective, exploded view of the first connector.
Figure 11:
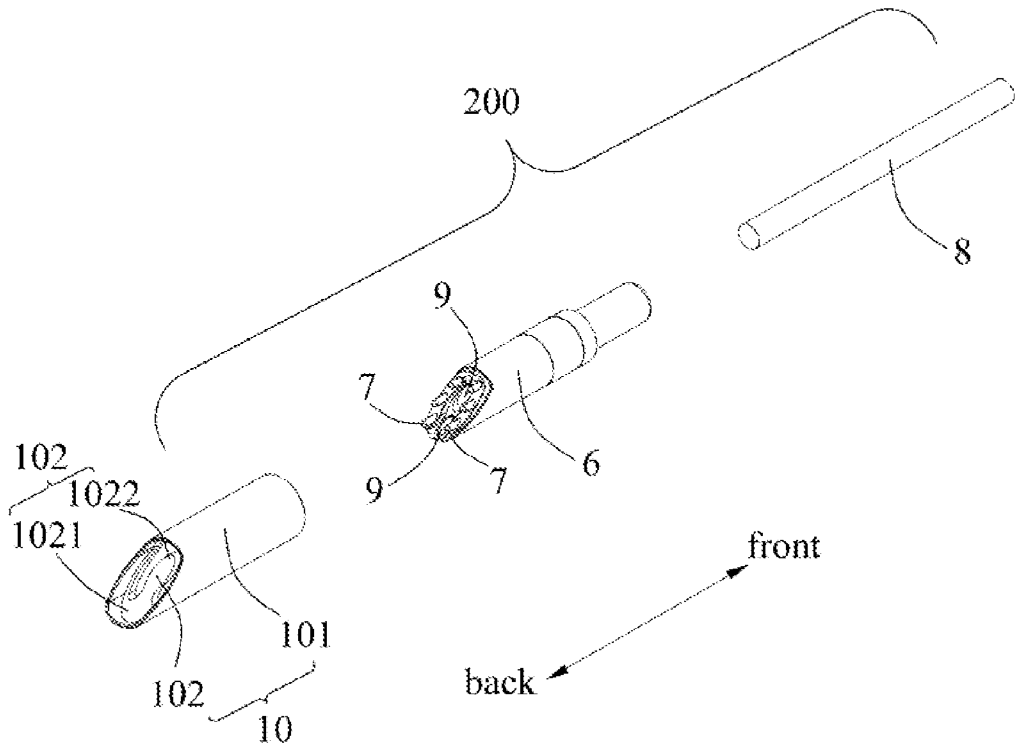
FIG. 11 is a perspective, exploded view of the second connector.
Figure 12:
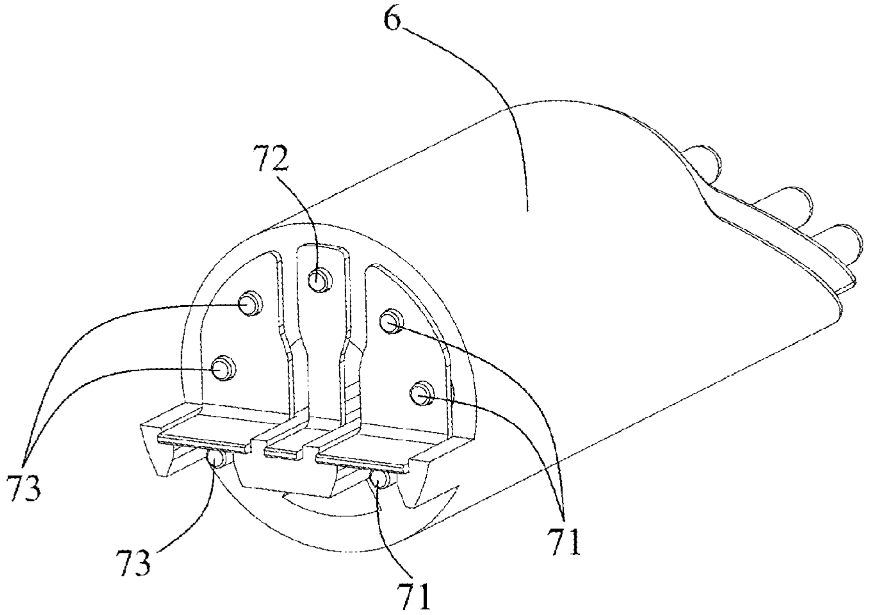
FIG. 12 is a perspective, assembled view of the second connector.

Referring to FIGS. 3, 11 and 12, either the first conductive terminals 2 or the second conductive terminals 7 have elasticity. During the connection between the first conductive terminals 2 and the second conductive terminals 7, either the first conductive terminals 2 or the second conductive terminals 7 are pressed such that electrical connection is perfectly achieved between the first conductive terminals 2 and the second conductive terminals 7. In an alternative embodiment, both the first conductive terminals 2 and the second conductive terminals 7 having elasticity for better electrical connection.

Figure 8:
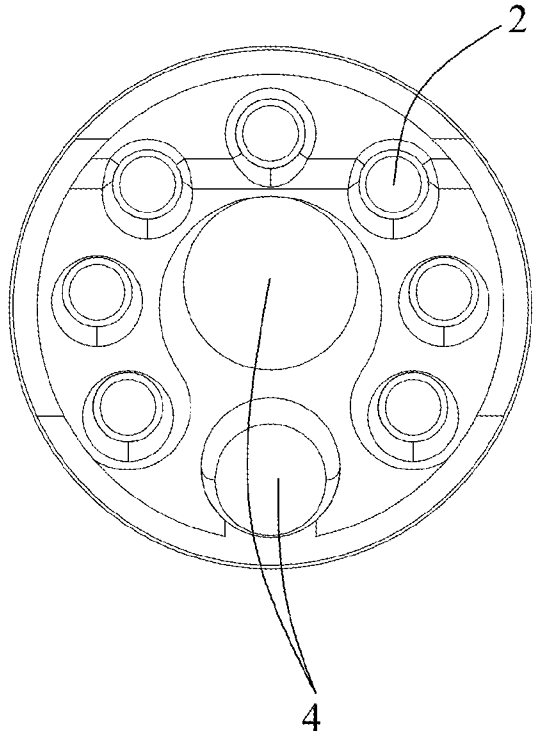
FIG. 8 is a front view of FIG. 4.
Figure 9:
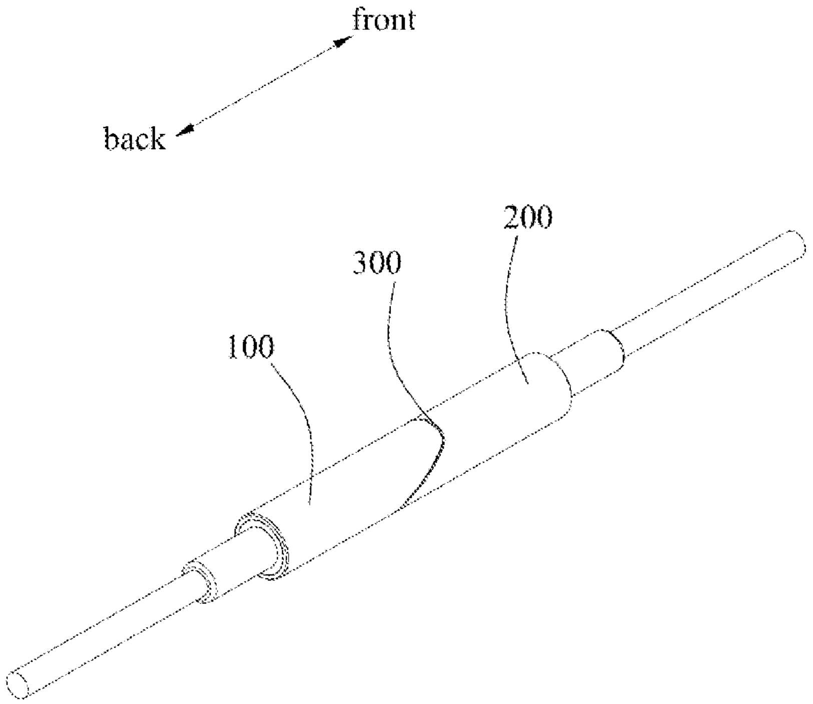
FIG. 9 is similar to FIG. 1 but taken a view from another angle.
Figure 10:
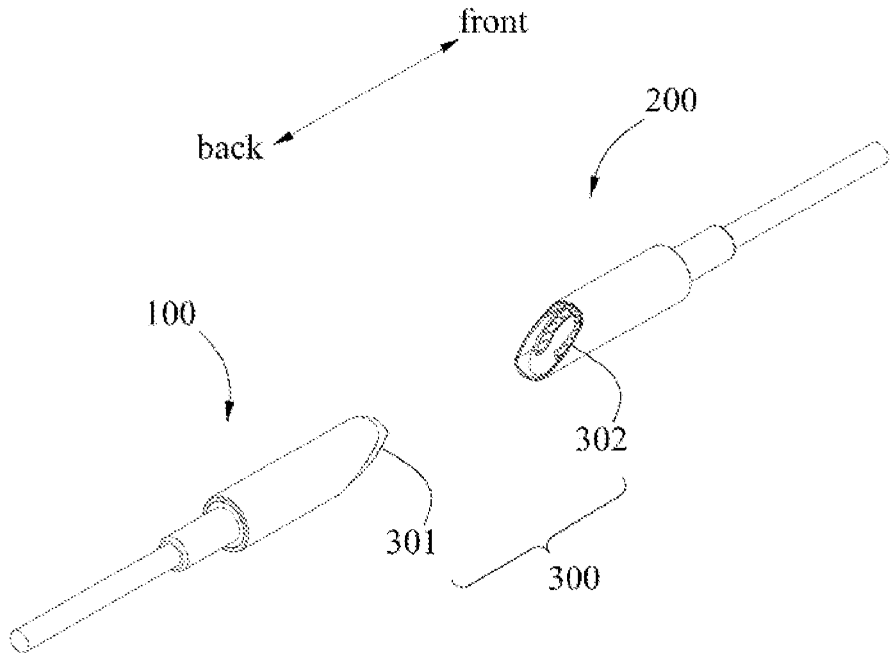
FIG. 10 is similar to FIG. 2 but taken a view from another angle.
Figure 16:
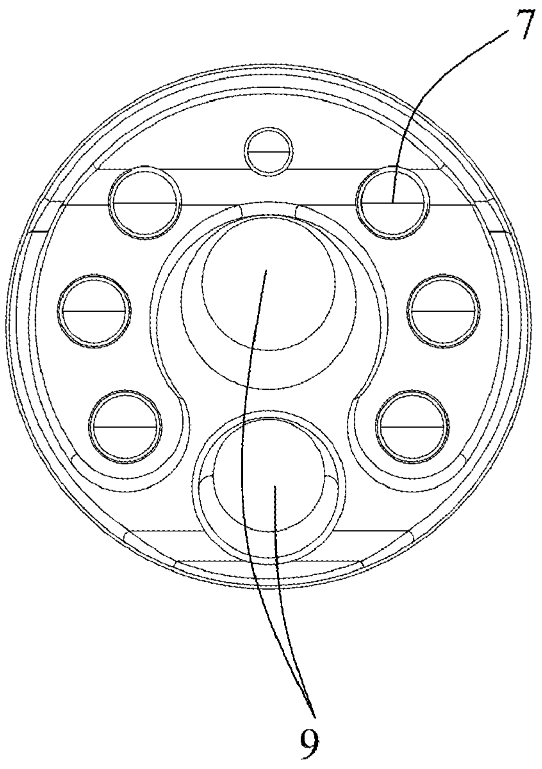
FIG. 16 is a back view of FIG. 12.

Referring to FIGS. 8 and 16, in the preferred embodiment of the present disclosure, the first magnets 4 are shown as two and the two first magnets 4 are encircled by the first conductive terminals 2. Accordingly, the second magnets 9 are also shown as two and the two second magnets 9 are also encircled by the second conductive terminals 7. The number of the first magnets 4 and the number of the second magnets 9 are both not limited to two, and may be one or more. When the number of the first magnets 4 and the number of the second magnets 9 are both one, the magnetic attraction between the first magnets 4 and the second magnets 9 is not strong enough. When the number of the first magnets 4 and the number of the second magnets 9 are both two or more, a stronger magnetic attraction can be provided, and therefore, the stability of the connection between the first connection terminal 100 and the second connecting terminal 200 can be better guaranteed. The word "encircled" refers two aspects, a first aspect is that one of the first magnets 4 (located at a middle position in FIG. 8 and so named a middle-positioned first magnet 4) is surrounded by the first conductive terminals 2, and a second aspect is that the other one of the first magnets 4 (located at a peripheral position in FIG. 8 and so named a peripheral-positioned first magnet 4)

is located between two of the conductive terminals 2. In other words, the peripheral-positioned first magnet 4 is on a circle defined by the first conductive terminals 2. In other words, the peripheral-positioned first magnet 4 together with the first conductive terminals 2 enclose the middle-positioned first magnet 4. The second magnets 9 also include a middle-positioned second magnet 9 and a peripheral-positioned second magnet 9, and the peripheral-positioned second magnet 9 together with the second conductive terminals 7 enclose the middle-positioned second magnet 9. Of course, in other embodiment, the positions of the first magnets 4 and the second magnets 9 may not be "encircled" but set in other positions. For example, the first magnets 4 are located on the periphery of the first conductive terminals 2, the second magnets 9 are correspondingly located on the periphery of the second conductive terminals 7.

Figure 7:
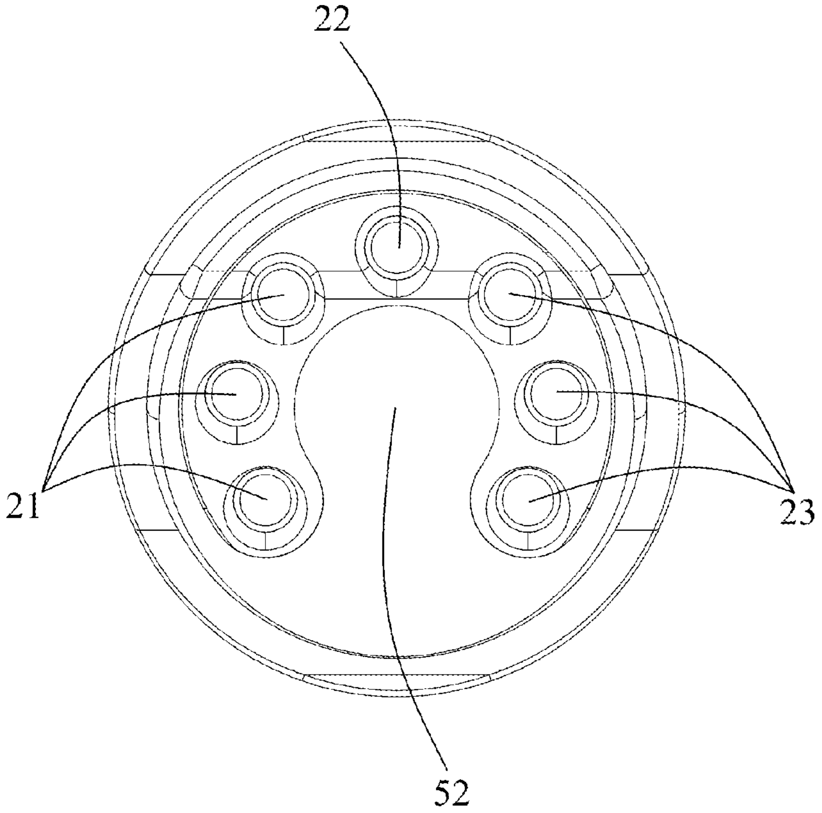
FIG. 7 is a front view of FIG. 5.
Figure 15:
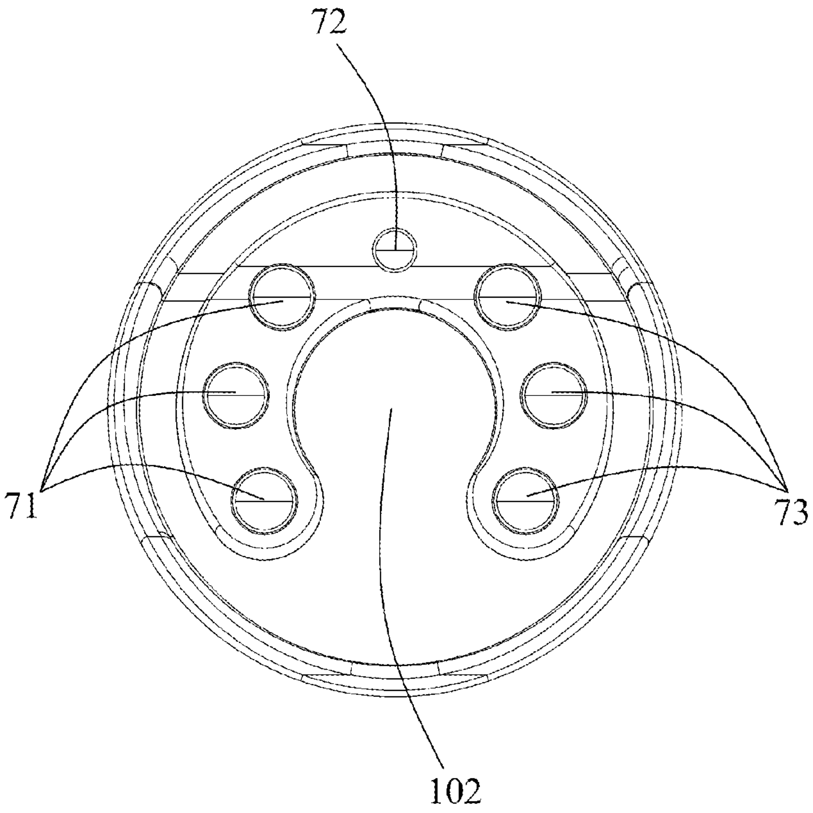
FIG. 15 is a back view of FIG. 13.

Referring to FIGS. 3 and 7, the first cover 5 includes a first enclosing ring 51 and a first shielding baffle 52. The first enclosing ring 51 wraps around the first insulative body 1, and the first shielding baffle 52 extend angularly from a first front edge of the first enclosing ring 51 towards a second front edge of the first enclosing ring 51. The first front edge of the first enclosing ring 51 and the second front edge of the first enclosing ring 51 are opposed to each other. The first shielding baffle 52 shields the first magnet 4 but exposes the second ends of the first conductive terminals 2. The first shielding baffle 52 includes a first distal end portion 522 and a first connecting portion 521 which is connected between the first distal end portion 522 and the first enclosing ring 51. The first distal end portion 522 is spaced away from the first cable 3 farther than the first connecting portion 521. Referring to FIGS. 11 and 15, the second cover 10 includes a second enclosing ring 101 and a second shielding baffle 102. The second enclosing ring 101 is wrapped around the second insulative body 6, and the second shielding baffle 102 extend angularly from a first front edge of the second enclosing ring 101 towards a second front edge of the second enclosing ring 101. The first front edge of the second enclosing ring 101 and the second front edge of the second enclosing ring 101 are opposed to each other. The second shielding baffle 102 shields the second magnet 9 but exposes the second ends of the second conductive terminals 7. The second shielding baffle 102 includes a first distal end portion 1022 and a first connecting portion 1021 which is connected between the first distal end portion 1022 and the second enclosing ring 101. The second connecting portion 1021 is spaced away from the second cable 8 farther than the first distal end portion 1022. In other words, each of the two covers 5/10 has an enclosing ring 51/101 and a shielding baffle 52/102. The enclosing rings 51/101 respectively and correspondingly wraps around the first insulative body 1/the second insulative body 6, and the shielding baffles 52/102 respectively and correspondingly provide shield to the first magnet 4/the second magnet 9 but provides no shield to the second ends of the first conductive terminals 2/the second conductive terminals 7.

In a preferred embodiment, the first shielding baffle 52 and the second shielding baffle 102 are both inclined surfaces and both keep flat with the front edges of the enclosing rings 51/101. So that, the first shielding baffle 52 forms the contacting surface 301 of the first connector 100 and the second shielding baffle 102 forms the mating surface 302 of the second connector 200. In other words, the contacting surface 301 and the mating surface 302 have high consistence with the coupling surface 300 without offset. But as shown in FIGS. 2-3 and 10-11, the contacting surface 301 is convex-shaped with respect to the coupling surface 300 and the mating surface 302 is concave-shaped with respect to the coupling surface 300. In other words, the contacting surface 301 and the mating surface 302 have no high consistence with the coupling surface 300 but with offset. The contacting surface 301 and the mating surface 302 of the present disclosure are concave-convex fitted with each other.

Figure 4:
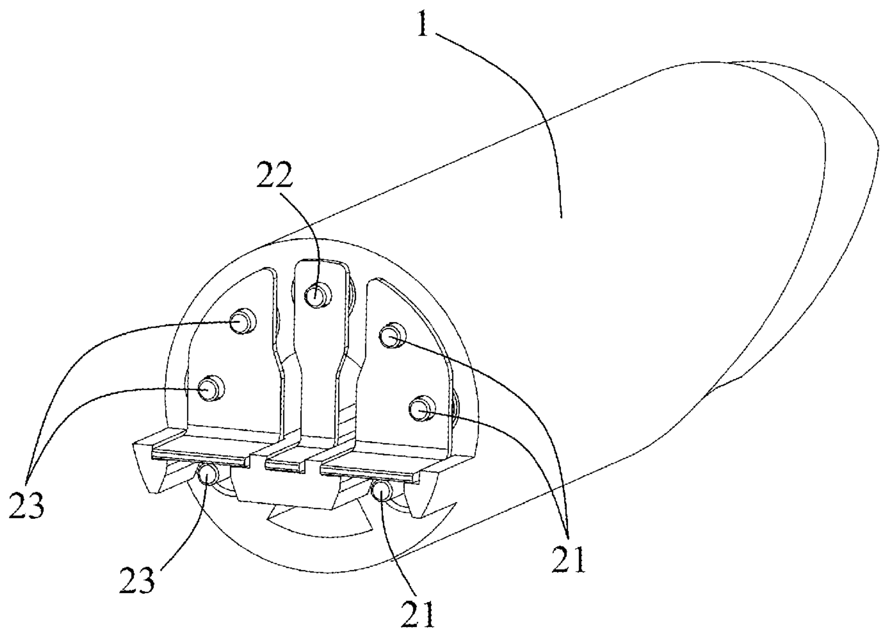
FIG. 4 is a perspective, assembled view of the first connector.

Referring to FIGS. 4-6 and 12-14, the connector assembly of the present disclosure also includes a plurality of metal transition pieces 11. The metal transition pieces 11 are not only connected between the first conductive terminals 2 and the first cable 3, but also connected between the second conductive terminals 7 and the second cable 8. As shown in FIG. 4 of the present disclosure, the first conductive terminals 2 include three power signal terminals 21, one data signal terminal 22, and three ground signal terminals 23. Similarly shown in FIG. 12 of the present disclosure, the second conductive terminals 7 include three power signal terminals 71, one data signal terminal 72, and three ground signal terminals 73. Of course, the various signal types of the first conductive terminals 2 and the second conductive terminals 7 can also be other numbers, which are not specifically limited in the present disclosure. Each of the first cable 3 and the second cable 8 includes a plurality of power signal cores (not shown), a plurality of data signal cores (not shown), and a plurality of ground signal cores (not shown). Of course, the various signal types of the first cable 3 and the second cable 8 can also be other numbers, which are not also limited in the present disclosure. Generally speaking, the power signal terminals 21/71 and the corresponding power signal cores, the data signal terminals 22/72 and the corresponding data signal cores, the ground signal terminals 23/73 and the corresponding ground signal cores are all acquired at least one in number. The metal transition piece 11 includes a first transition piece 111, a second transition piece 112, a third transition piece 113, a fourth transition piece 114, a fifth transition piece 115, and a sixth transition piece 116. In a specific embodiment, the three power signal terminals 21 of the first conductive terminals 2 and the corresponding three power signal cores are all connected to the first transition piece 111, the one data signal terminal 22 of the first conductive terminal 2 and a corresponding one of the data signal cores are connected to the second transition piece 112, and the three ground signal terminals 23 of the first conductive terminals 2 and the corresponding three ground signal cores are all connected to the third transition piece 113. The three power signal terminals 71 of the second conductive terminals 7 and the corresponding three power signal cores are all connected to the fourth transition piece 114, the one data signal terminal 72 of the second conductive terminals 7 and the corresponding one of the data signal cores are connected to the fifth transition piece 115, the three ground signal terminals 73 of the second conductive terminals 7 and the corresponding three ground signal cores are all connected to the sixth transition piece 116. In other words, the first transition piece 111 and the fourth transition piece 114 are both power signal transition pieces 111/114, the second transition piece 112 and the fifth transition piece 115 are both data signal transition pieces 112/115, the third transition piece 113 and the sixth transition piece 116 are both ground signal transition pieces 113/116. The power signal transition pieces 111/114 connect the power signal terminals 21/71 and the power signal cores one by one to achieve parallel connection, the data signal transition pieces 112/115 connect the data signal terminals 22/72 and the data signal cores, and the ground signal transition pieces 113/116 connect the ground signal terminals 23/73 and the ground signal cores one by one to achieve parallel connection. In other words, the power signal terminals 21 of the first conductive terminals 2 and the power signal cores of the first cable 3 are connected with each other via the first transition piece 111, the data signal terminals 22 of the first conductive terminals 2 and the data signal core of the first cable 3 are connected with each other via the second transition piece 112, and the ground signal terminals 23 of the first conductive terminals 2 and the ground signal core of the first cable 3 are connected with each other via the third transition piece 113, the power signal terminal 71 of the second conductive terminals 7 and the power signal core of the second cable 8 are connected with each other via the fourth transition piece 114, the data signal terminals 72 of the second conductive terminals 7 and the at least one data signal core of the second cable 7 are connected with each other via the fifth transition piece 115, and the ground signal terminals 73 of the second conductive terminals 7 and the ground signal core of the second cable 7 are connected with each other via the sixth transition piece 116. Multiple conductive terminals are transmitted in parallel, which simplifies and optimizes the wire bonding process, thereby achieving greater electrical demand transmission (such as high current demand).

Figure 5:
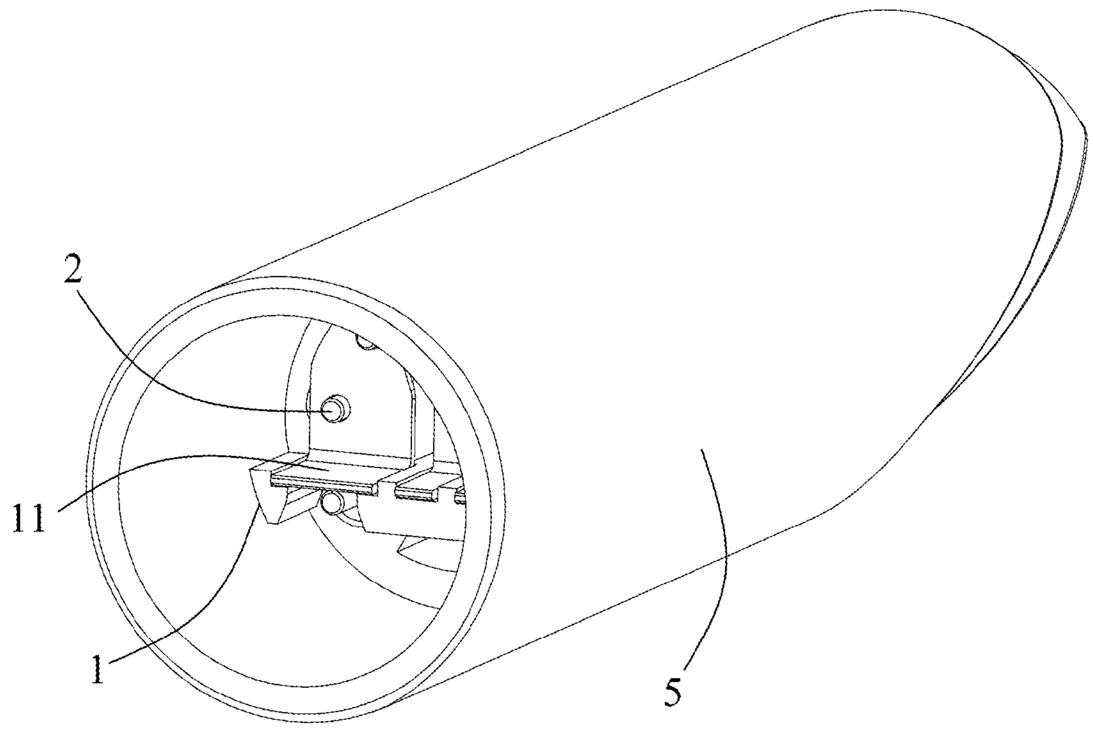
FIG. 5 is another perspective, assembled view of the first connector.
Figure 6:
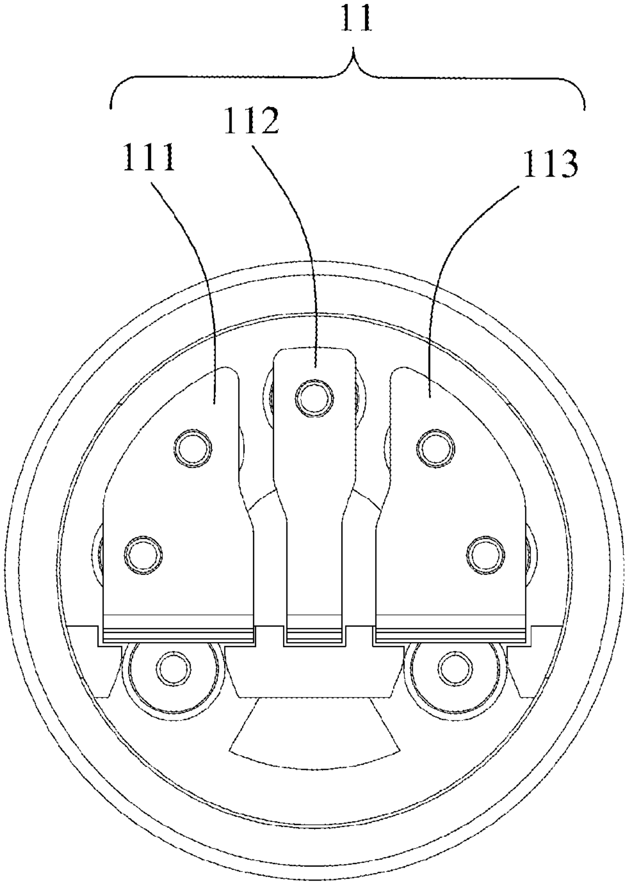
FIG. 6 is a back view of FIG. 5.
Figure 13:
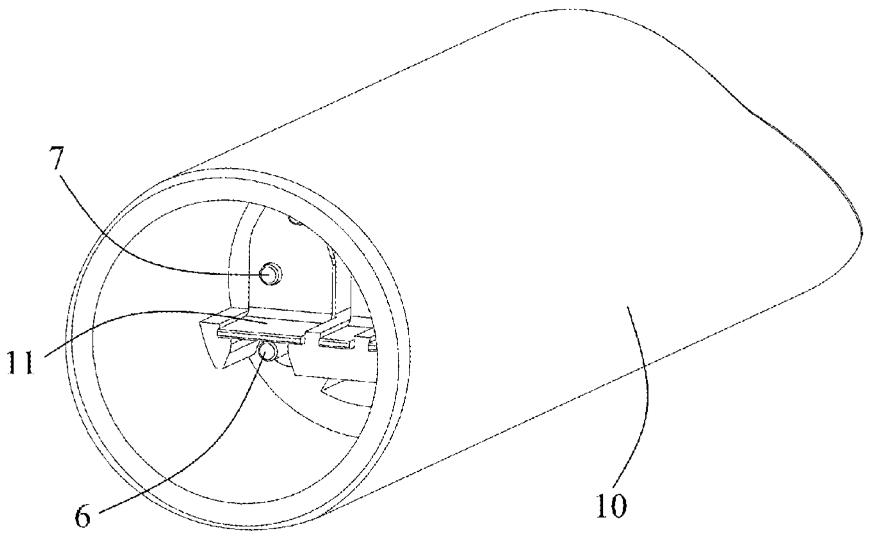
FIG. 13 is another perspective, assembled view of the second connector.
Figure 14:
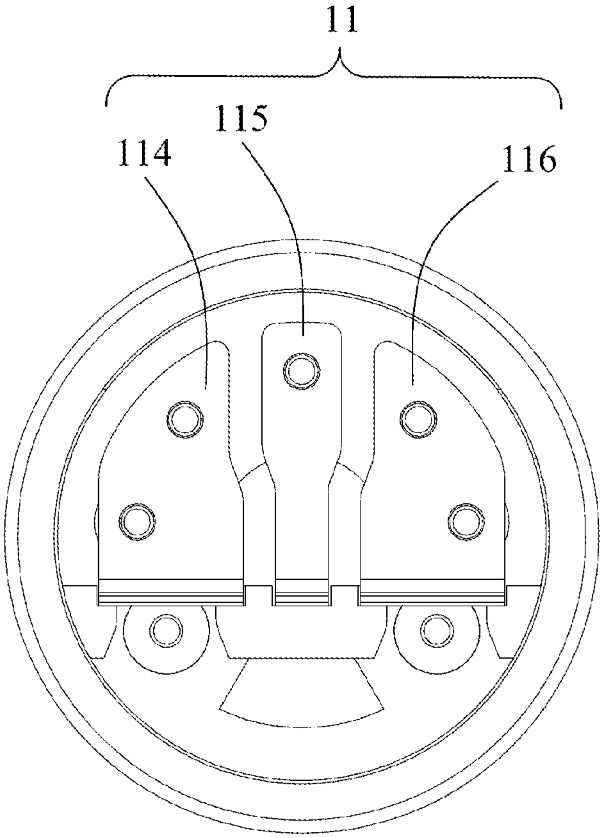
FIG. 14 is a front view of FIG. 13.

Referring to FIGS. 5 and 13, in a preferred embodiment of the present disclosure, the metal transition piece 11 interferes with at least one of the first insulative body 1 and the second insulative body 6, so that the first insulative body 1 and/or the second insulative body 6 can provide supporting force to the metal transition piece 11. In other embodiments of the present disclosure, the first insulative body 1 and the second insulative body 6 provide no supporting force to the metal transition piece 11. For instead, the metal transition piece 11 is connected to the rear walls of the first insulative body 1 and the second insulative body 6 by pasting.

In summary, the connector assembly of the present disclosure includes the first connector 100 and the second connector 200 that are magnetically engaged with each other. Therefore, no matter which one of the first connector 100 or the second connector 200 is damaged, it can be freely replaced. In other words, it is very convenient to replace a destroyed first connector 100 into a new first connector 100 and the new first connector 100 is very convenient to match with an original second connector 200; it is very convenient to replace a destroyed second connector 200 into a new second connector 200 and the new second connector 200 is very convenient to match with an original first connector 100. Therefore, waste of resources caused by discarding the entire connector assembly is avoided.

The above embodiments are only used to illustrate the present disclosure and not to limit the technical solutions described in the present disclosure. The understanding of this specification should be based on those skilled in the art. Descriptions of directions, such as "front", "back", "left", "right", "upper" and "lower", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector assembly, comprising:

a first connector, comprising:

a plurality of first conductive terminals;

a first insulative body fixing the first conductive terminals;

a first cable electrically connected to the first conductive terminals; and at least one first magnet contained in the first insulative body;

a second connector, comprising:

a plurality of second conductive terminals;

a second insulative body fixing the second conductive terminals;

a second cable electrically connected to the second conductive terminals; and at least one second magnet contained in the second insulative body; and a plurality of metal transition pieces, not only connected between the first conductive terminals and the first cable, but also connected between the second conductive terminals and the second cable;

wherein a coupling surface is formed between the first connector and the second connector, the at least one first magnet and the at least one second magnet are correspondingly magnetically engaged with each other at the coupling surface for combining the first connector and the second connector as a whole; and wherein the first conductive terminals are mechanically contacted with the second conductive terminals nearby the coupling surface so as to achieve electrical connection between the first conductive terminals and the second conductive terminals.

2. The connector assembly according to claim 1, wherein both the first conductive terminals and the second conductive terminals comprise at least one power signal terminal, at least one data signal terminal, and at least one ground signal terminal;

wherein both the first cable and the second cable comprise at least one power signal core, at least one data signal core, and at least one ground signal core;

wherein the metal transition pieces comprise at least two power signal transition pieces, at least two data signal transition pieces, and at least two ground signal transition pieces; and wherein each power signal transition piece connects the power signal terminal with the corresponding power signal core for power signal transmission, each data signal transition piece connects the data signal terminal with the corresponding data signal core for data signal transmission, and each ground signal transition piece connects the ground signal terminal with the corresponding ground signal core for ground signal transmission.

3. The connector assembly according to claim 1, wherein the metal transition pieces interfere with at least one of the first insulative body and the second insulative body.

4. The connector assembly according to claim 1, wherein either the first conductive terminals or the second conductive terminals have elasticity such that electrical connection is perfectly achieved between the first conductive terminals and the second conductive terminals.

5. The connector assembly according to claim 1, further comprising a first cover and a second cover;

wherein both the first cover and the second cover have an enclosing ring and a shielding baffle; and wherein the enclosing ring of the first cover wraps around the first insulative body and the enclosing ring of the second cover wraps around the second insulative body, the shielding baffle of the first cover provides shield to the at least one first magnet but provides no shield to the first conductive terminals, the shielding baffle of the second cover provides shield to the at least one second magnet but provides no shield to the second conductive terminals.

6. The connector assembly according to claim 1, wherein the at least one first magnet is encircled by the first conductive terminals and the at least one second magnet is encircled by the second conductive terminals.

7. A first connector, comprising:

an inclined contacting surface adapted for mating with an inclined mating surface of a second connector;

a first cable;

a first insulative body;

a plurality of first conductive terminals fixed in the first insulative body, the first conductive terminals comprising a plurality of first ends and a plurality of second ends, the first ends extending backward for being electrically connected to the first cable, the second ends extending forward and beyond the first insulative body; and a plurality of first magnets contained in the first insulative body and extending forward to abut against the inclined contacting surface;

wherein the first magnets comprise a middle-positioned first magnet and a peripheral-positioned first magnet, the middle-positioned first magnet extends longer than the peripheral-positioned first magnet so as to be adapted to the inclined contacting surface.

8. The first connector according to claim 7, further comprising a first cover, the first cover comprising a first enclosing ring wrapping around the first insulative body and a first shielding baffle locating at the inclined contacting surface, the first shielding baffle extending angularly from a first front edge of the first enclosing ring and towards a second front edge of the first enclosing ring, the second front edge of the first enclosing ring opposing to the first front edge of the first enclosing ring, the first shielding baffle comprising a first distal end portion and a first connecting portion, the first connecting portion being connected between the first distal end portion and the first enclosing ring, the first distal end portion being spaced away from the first cable farther than the first connecting portion.

9. The first connector according to claim 8, wherein the first shielding baffle forms the inclined contacting surface for shielding the first magnets but exposing the second ends of the first conductive terminals.

10. The first connector according to claim 7, further comprising a plurality of metal transition pieces connecting between the first conductive terminals and the first cable;

wherein the metal transition pieces interfere with the first insulative body.

11. The first connector according to claim 10, wherein the first conductive terminals comprise at least one power signal terminal, at least one data signal terminal, and at least one ground signal terminal;

wherein the first cable comprises at least one power signal core, at least one data signal core, and at least one ground signal core;

wherein the metal transition pieces comprise a first transition piece, a second transition piece, and a third transition piece; and wherein the at least one power signal terminal of the first conductive terminals and the at least one power signal core of the first cable are connected with each other via the first transition piece, the at least one data signal terminal of the first conductive terminals and the at least one data signal core of the first cable are connected with each other via the second transition piece, and the at least one ground signal terminal of the first conductive terminals and the at least one ground signal core of the first cable are connected with each other via the third transition piece.

12. A second connector, comprising:

an inclined mating surface adapted for mating with an inclined contacting surface of a first connector;

a second cable;

a second insulative body;

a plurality of second conductive terminals fixed in the second insulative body, the second conductive terminals comprising a plurality of first ends and a plurality of second ends, the first ends extending forward for being electrically connected to the second cable, the second ends extending backward and beyond the second insulative body; and a plurality of second magnets contained in the second insulative body and extending backward to abut against the inclined mating surface;

wherein the second magnets comprise a middle-positioned second magnet and a peripheral-positioned second magnet, the peripheral-positioned second magnet extends longer than the middle-positioned second magnet so as to be adapted to the inclined mating surface.

13. The second connector according to claim 12, further comprising a second cover, the second connector comprising a second enclosing ring wrapping around the second insulative body and a second shielding baffle locating at the inclined mating surface, the second shielding baffle extending angularly from a first back edge of the second enclosing ring towards a second back edge of the second enclosing ring, the second back edge of the second enclosing ring opposing to the first back edge of the second enclosing ring, the second shielding baffle comprising a second distal end portion and a second connecting portion, the second connecting portion being connected between the second distal end portion and the second enclosing ring, the second connecting portion being spaced away from the second cable farther than the second distal end portion.

14. The second connector according to claim 13, wherein the second shielding baffle forms the inclined mating surface for shielding the second magnets but exposing the second ends of the second conductive terminals.

15. The second connector according to claim 12, further comprising a plurality of metal transition pieces connecting between the second conductive terminals and the second cable; wherein the metal transition pieces interfere with the second insulative body.

16. The second connector according to claim 15, wherein the second conductive terminals comprise at least one power signal terminal;

wherein at least one data signal terminal, and at least one ground signal terminal; the second cable comprises at least one power signal core, at least one data signal core, and at least one ground signal core;

wherein the metal transition pieces comprise a fourth transition piece, a fifth transition piece, and a sixth transition piece; and wherein the at least one power signal terminal of the second conductive terminals and the at least one power signal core of the second cable are connected with each other via the fourth transition piece, the at least one data signal terminal of the second conductive terminals and the at least one data signal core of the second cable are connected with each other via the fifth transition piece, and the at least one ground signal terminal of the second conductive terminals and the at least one ground signal core of the second cable are connected with each other via the sixth transition piece.

* * * * *